(12) United States Patent
Tubbs et al.

(10) Patent No.: US 7,497,638 B2
(45) Date of Patent: Mar. 3, 2009

(54) SOCKET JOINT FOR TIE-ROD ATTACHMENT SYSTEM AND METHOD

(75) Inventors: Gregory A. Tubbs, Marysville, WA (US); Stephen L. Scown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 11/595,286

(22) Filed: Nov. 9, 2006

(65) Prior Publication Data

US 2008/0112753 A1 May 15, 2008

(51) Int. Cl.
*F16C 11/00* (2006.01)
(52) U.S. Cl. .................. 403/76; 403/240; 403/263; 403/353; 244/118.1; 244/131
(58) Field of Classification Search .......... 403/69, 403/70, 76, 240, 263, 353, 361; 244/118.1, 244/131
See application file for complete search history.

(56) References Cited

U.S. PATENT DOCUMENTS

| | | | | |
|---|---|---|---|---|
| 3,003,399 A | * | 10/1961 | Donner | 403/353 |
| 3,146,008 A | * | 8/1964 | George | 403/76 |
| 3,700,199 A | * | 10/1972 | Matuska | 244/118.1 |
| 4,014,195 A | * | 3/1977 | Grogan | 403/353 |
| 5,755,526 A | * | 5/1998 | Stanevich | 403/122 |
| 6,718,864 B2 | * | 4/2004 | Abe et al. | 92/155 |
| 6,769,831 B2 | * | 8/2004 | Aquino et al. | 244/118.1 |
| 6,883,753 B1 | | 4/2005 | Scown | |
| 7,007,892 B2 | | 3/2006 | Tubbs | |
| 7,059,565 B2 | | 6/2006 | Scown et al. | |
| 7,128,295 B2 | | 10/2006 | Scown | |
| 2005/0005544 A1 | | 1/2005 | Borowiecki et al. | |

* cited by examiner

*Primary Examiner*—Daniel P Stodola
*Assistant Examiner*—Michael P Ferguson
(74) *Attorney, Agent, or Firm*—NovaTech IP Law

(57) ABSTRACT

An apparatus, system, and method includes a socket having a substantially spherical inner contour being accessible via an opening. A member having a partial spherical shape substantially similar to the spherical inner contour. A cross-sectional profile of the member is adapted to pass through the opening into the socket and to remain uncoupled with the socket when the socket and the member are in a first relative orientation. The member is further adapted to couple with the socket when the member is in the socket and in a second relative orientation with the socket.

18 Claims, 6 Drawing Sheets

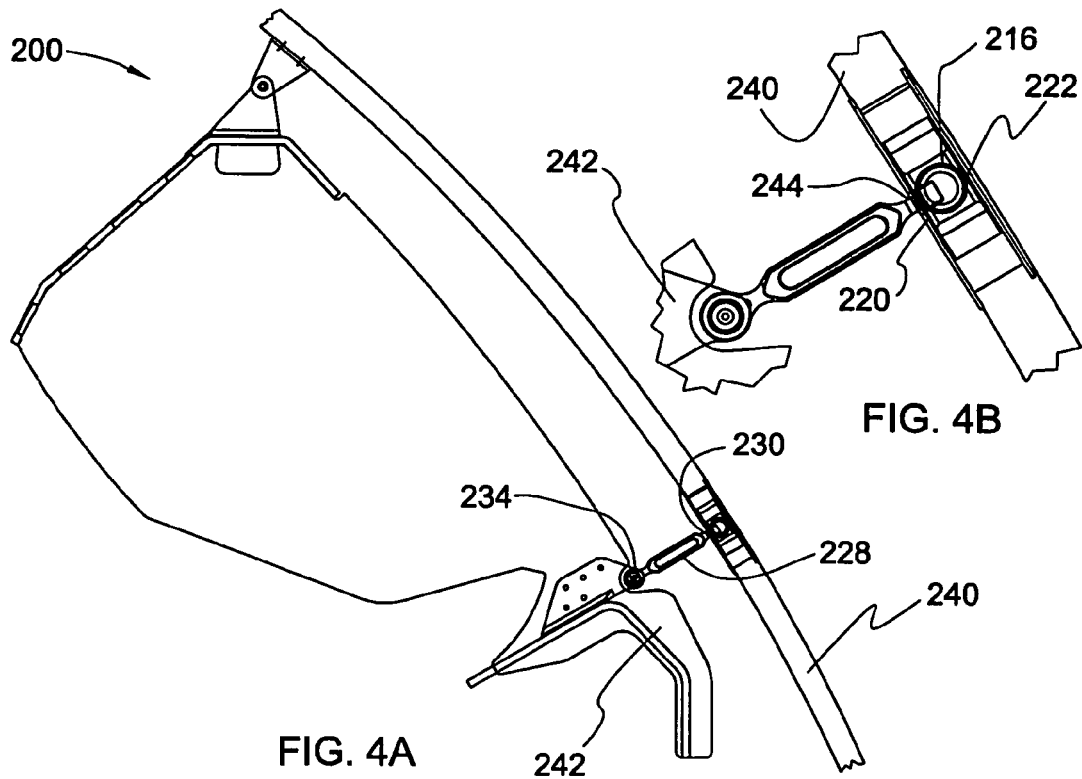
FIG. 4B
FIG. 4A
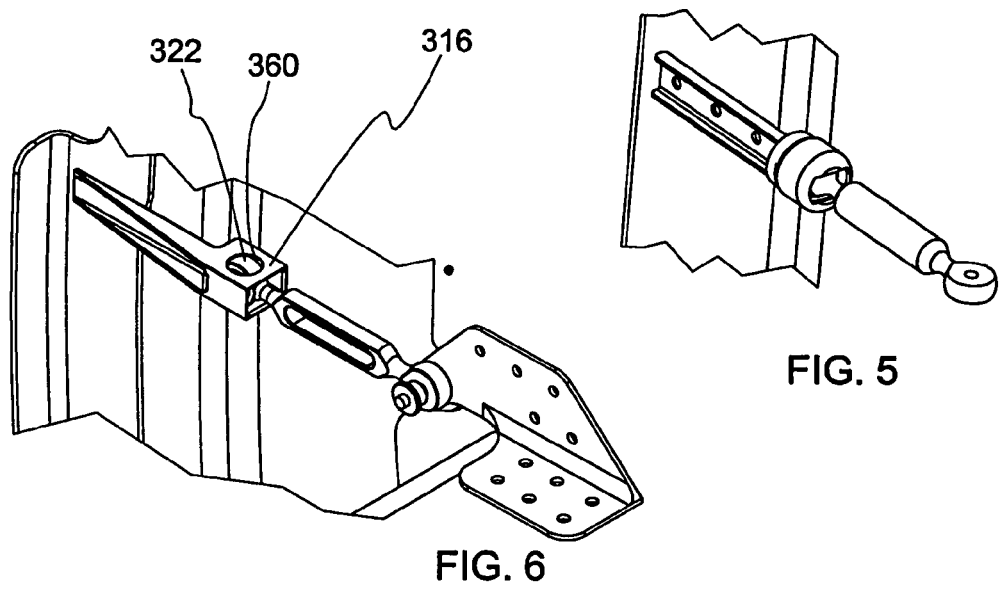
FIG. 5
FIG. 6

SOCKET JOINT FOR TIE-ROD ATTACHMENT SYSTEM AND METHOD

TECHNICAL FIELD

Embodiments of the present invention relate to the field of struts and tie rods, and more specifically, to a socket joint and strut assembly adapted to enable attachment at one end without additional hardware.

BACKGROUND

Tie-rods, or struts, have traditionally been used to mount stowage bins to the airframe of commercial aircraft. This method also is used to control the overturning forward loads of floor-mounted monuments (lavs, galleys, closets), as well as many applications on primary aircraft structure.

Typically, a clevis fitting is permanently fastened to the primary structure as the interface provision to attach a tie-rod. The upper end of the tie-rod is pinned or bolted to the clevis fitting. The lower end of the tie-rod is pinned or bolted to a fitting that is permanently attached to the top, or back, of the stowage bin box or monument.

The installation of the tie-rod to the fuselage requires a mechanic to be able to reach the fitting to bolt, or pin, the tie-rod to the fuselage fitting and the fitting on the stowage bin or monument. Tie-rod installation may also require two mechanics, one at each end, to manipulate the tie-rod and the necessary attachment hardware.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 4A is a side view and FIG. 4B is an expanded view of a portion of FIG. 4A, illustrating various embodiments according to the invention;

FIG. 5 illustrates various embodiments in accordance with the invention;

FIG. 6 illustrates various embodiments in accordance with the invention;

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present description, a phrase in the form "A/B" means A or B. For the purposes of the present description, a phrase in the form "A and/or B" means "(A), (B), or (A and B)." For the purposes of the present description, a phrase in the form "at least one of A, B, and C" means "(A), (B), (C), (A and B), (A and C), (B and C), or (A, B and C)." For the purposes of the present description, a phrase in the form "(A)B" means "(B) or (AB)," that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1A:
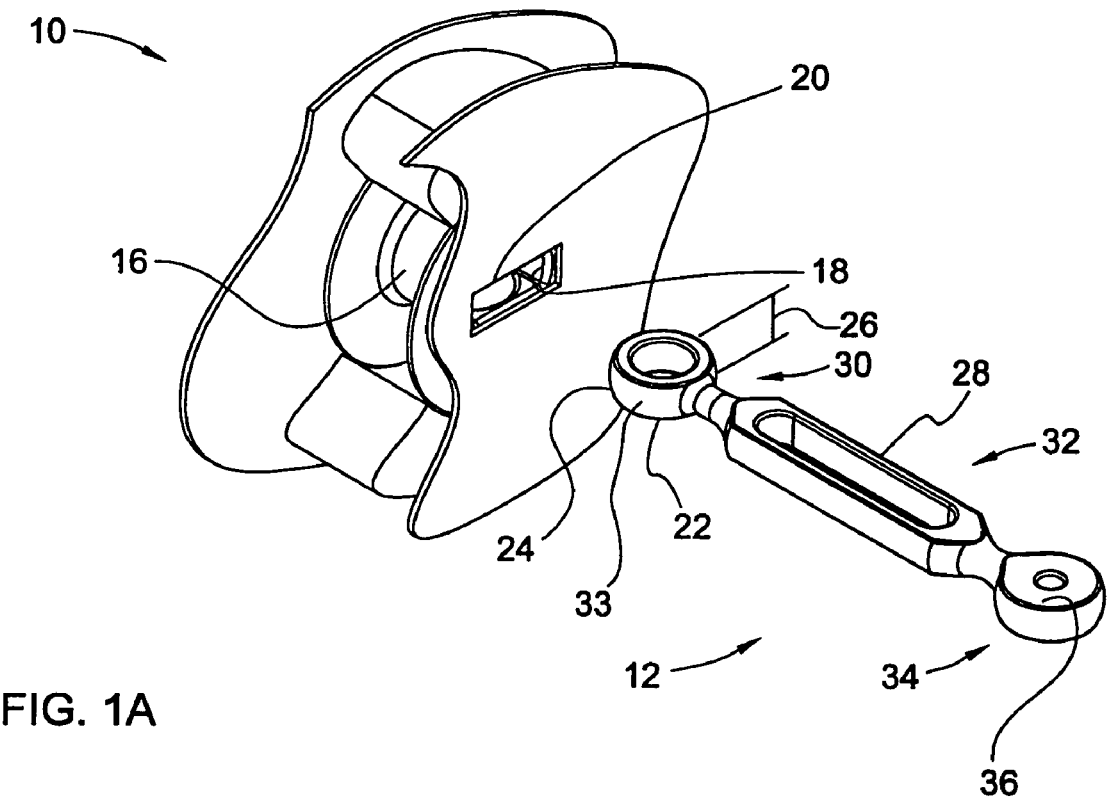
FIG. 1A and FIG. 1B are perspective views illustrating an apparatus in respective first and second orientations according to various embodiments in accordance with the invention.
Figure 1B:
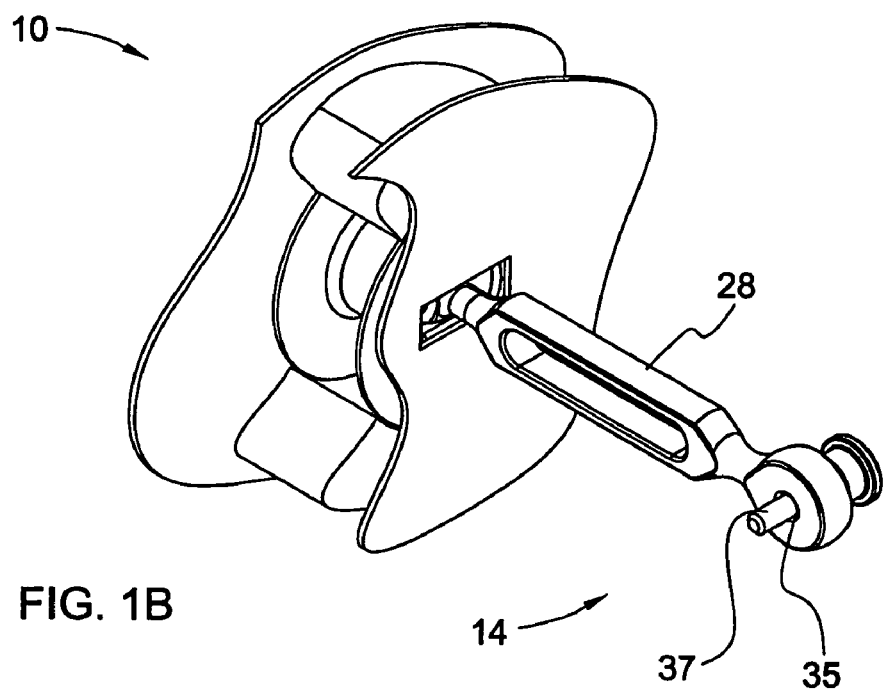

FIG. 1A and FIG. 1B are perspective views illustrating an apparatus 10 in a respective first orientation 12 and a second orientation 14 according to various embodiments in accordance with the invention. The apparatus 10 may include a socket 16 having a substantially spherical inner contour 18 being accessible via an opening 20. A member 22 may have a partial spherical shape 24 substantially similar to the substantially spherical inner contour 18 of the socket 16. The member 22 may also have a cross-sectional profile, as represented with a line 26, which may be adapted to pass through the opening 20 and into the socket 16. The member 22 may remain uncoupled with the socket 16 when the socket and the member are in the first relative orientation 12. The member 22 may be further adapted to couple with the socket 16 when the member 22 is in the socket 16, and in the second relative orientation 14 with the socket 16. The partial spherical shape 24 of the member 22 may be adapted to fit snuggly within the substantially spherical inner contour of the socket 16.

In various embodiments the apparatus 10 may further include an elongated member 28. One of the socket 16 and the member 22 may be coupled with a first end 30 of the elongated member 28, the other of the socket 16 and the member 22 may be coupled with a structural or frame member (not shown). The example embodiment illustrated in FIGS. 1A and 1B shows the elongated member 28 coupled with a member 22 at the first end 30. Other embodiments such as those discussed below may have a socket coupled with a first end of an elongated member.

In various embodiments the member 22 may include a discoid body 36 having a generally discoid shape with a circumferential edge 33 defining the partial spherical shape 24. The discoid body 36 may include a hole 35 therein. The hole 35 may be provided, for example, to reduce weight, or to minimize material.

Various embodiments may include, an article 32 having an elongated body 28 which may have a first end 30 and may have a first orientation 12, and a second orientation 14. The first end 30 may be adapted to pass through an opening into and out of a socket when the article 32 is in the first orientation 12. The first end 30 may also be further adapted to not pass through the opening, and may be adapted to be secured within the socket when in the second orientation 14. The elongated member 28 may also have a second end 34 adapted to be fixed to hold the article 32 in the second orientation 14. The second end 34 may include a hole 35 therethrough that may be adapted to receive a pin 37. In various embodiments the pin 37 may be a clevis pin and may be adapted to couple with, for example, a clevis fitting (not shown). The second end 34 may be adapted to be fixed in the second relative orientation by for example attaching the second end to a rigid body such as an aircraft fixture, such as a stowage bin, an aircraft monument, a lavatory, and the like.

Figure 2:
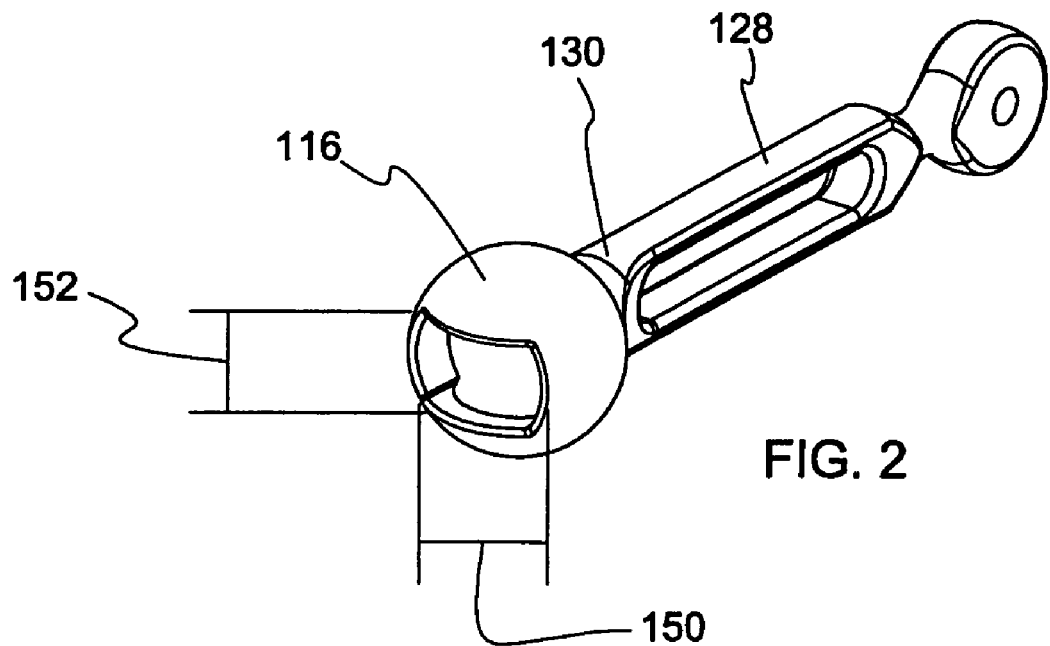
FIG. 2 illustrates various embodiments according to the invention.

FIG. 2 illustrates various embodiments according to the invention, wherein a socket 116 may be adapted to be coupled with a first end 130 of an elongated member 128. The socket 116 may in turn be adapted to be coupled to a member such as illustrated and discussed in FIGS. 1A and 1B. The socket 116 may have a wide opening 150 and a narrow opening 152. A member that may be the same, or similar to, the member 22 illustrated in FIGS. 1A and 1B may be adapted to pass through the wide opening 150 when in a first orientation, and adapted to be prevented from passing through the narrow opening 152 when in a second orientation.

Various embodiments may include a socket, which may be the same or similar to the sockets 16 discussed herein on both ends, or members which may be the same or similar to members 22 discussed herein on both ends. Or one of each on respective each end. In these "double-ended" embodiments, or one of the various "single-ended" embodiments, an additional connection may be made between the two ends that may be adapted to fix the elements in the captured orientation.

Various embodiments may be adapted to fix a member and socket in the captured orientation, for example, various embodiments may include a lock or other body that may be adapted to be positioned in, for example, to slide into the opening to fix the elements in place.

In various embodiments the opening may be a rectangle and the wide portion may define a longitudinal axis of the rectangle. The narrow portion may define a transverse axis of the rectangle. In various other embodiments the narrow portion may be offset from the wide portion.

In various embodiments, the article 32 as shown and discussed regarding FIGS. 1A and 1B or the article shown in FIG. 2, and multiple similarly constructed articles (not shown), and a socket, for example, a socket the same or similar to the socket shown in FIGS. 1A and 1B, or FIG. 2, and multiple similarly constructed sockets may be adapted to be formed into a scaffolding.

Various embodiments may be used in various coupling applications. For example, embodiments may be used in or with steering systems, cars, boats, snowmobiles, and the like. Various embodiments may also be used in opening and/or hold open applications, and/or for quick attachment or detachment of various objects.

Figure 3:
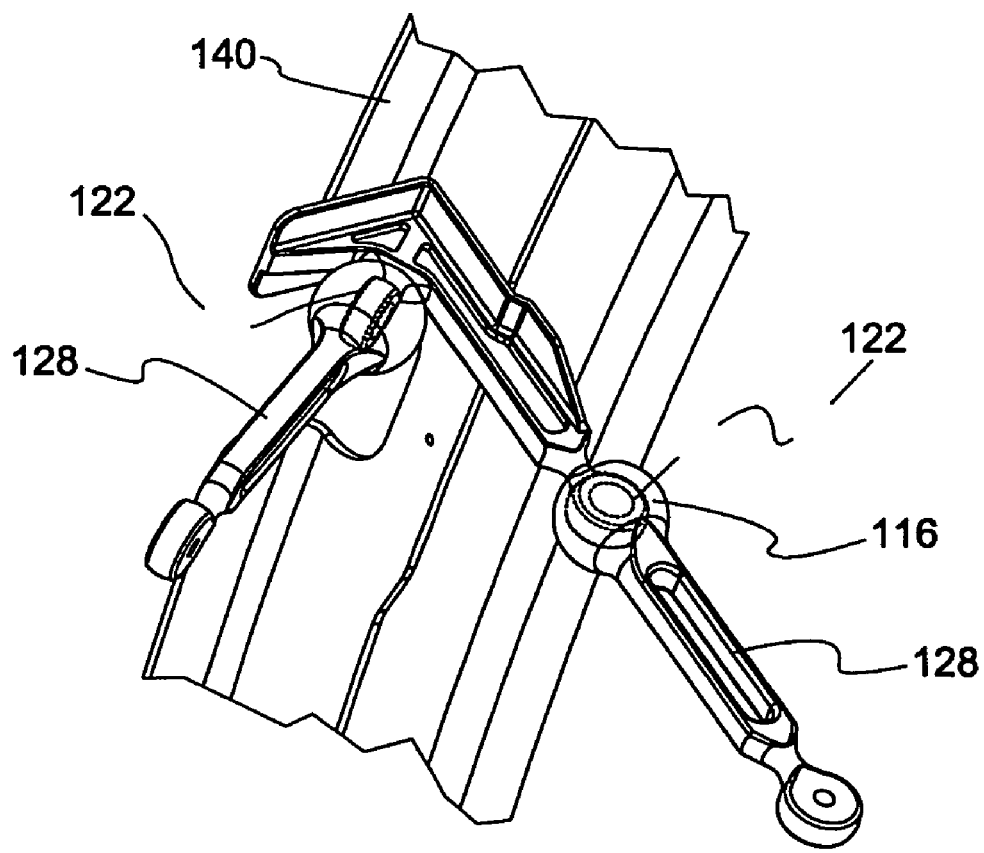
FIG. 3 is a perspective view according to various embodiments wherein members which may be the same or similar to member shown in FIGS. 1A and 1B, may be coupled with a frame member.

FIG. 3 is a perspective view according to various embodiments wherein members 122 which may be the same or similar to member 22 shown in FIGS. 1A and 1B, may be coupled with a frame member 140. Elongated members 128, for example tie-rods, may be coupled to the frame member 140 via the members 122 and sockets 116. The frame member 140 may be an aircraft fuselage.

FIG. 4A is a side view and FIG. 4B is an expanded view of a portion of FIG. 4A, illustrating various embodiments according to the invention. A system 200 may include a coupling element 222 which may have a substantially discoid shape. A socket 216 may have an opening 220 sized and shaped to allow the coupling element 222 to pass through into or out of the socket 216 when the coupling element 222 is in a first relative position. The socket 216 may be sized and shaped to prevent the coupling element 222 from being removed from the socket 216 when in a second relative position.

An elongated member 228 may have a first end 230 and a second end 234 and may be coupled at the first end 230 with one of the coupling element 222 and the socket 216. A body 242 such as but not limited to a stowage bin or an aircraft monument, may be adapted to be secured to the second end 234 of the elongated body. The body 242 may also be adapted to hold the one of the coupling element and the socket in the second relative position to secure the body to an aircraft fuselage 240 via the elongated member 228 by coupling with the elongated member 228 second end 234. The aircraft fuselage 240 may be coupled with an other of the one of the coupling element and the socket.

In various embodiments the elongated member may include a neck portion 244 adapted to couple the elongated member 228 with the coupling element 222. The opening 220 may include a narrow portion and a wide portion, the neck portion 244 may be sufficiently narrow to fit into the narrow portion. The diameter of the discoid shape may be sufficiently wide to not fit through the wide portion.

FIGS. 5 and 6 illustrate various embodiments in accordance with the invention illustrating just a few of the many possible ways to embody the invention not already described and illustrated. FIG. 5 illustrates how a socket 316 according to embodiments of the invention may be substantially rectilinear and may include holes 360 on opposite sides thereof (one being visible in the figure) adapted to receive the partial spherical shape of a coupling element 322.

Figure 7D:
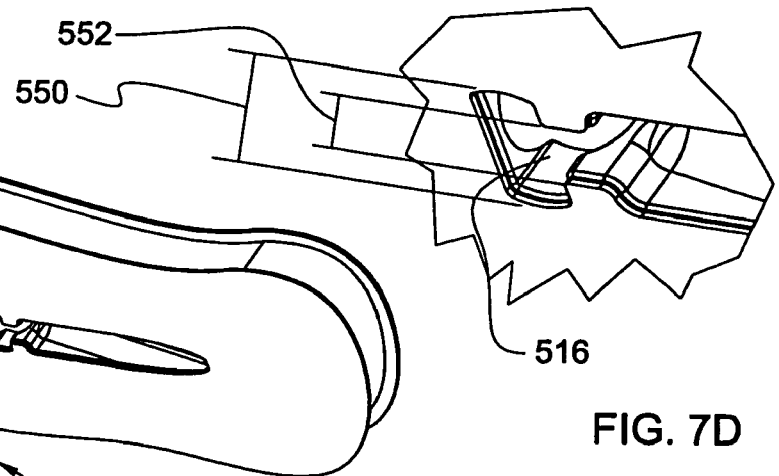
FIG. 7D is a detailed view illustrating a portion of FIG. 7A.
Figure 7A:
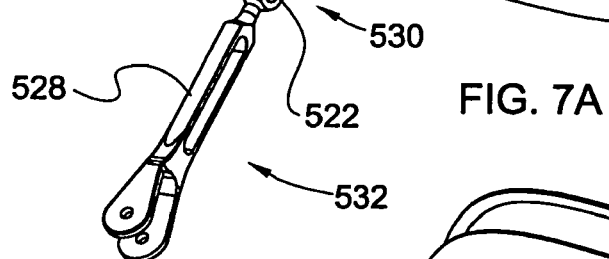
FIGS. 7A, 7B and 7C are perspective views according to various embodiments of the invention showing three relative positions of a coupling member and a socket.
Figure 7B:
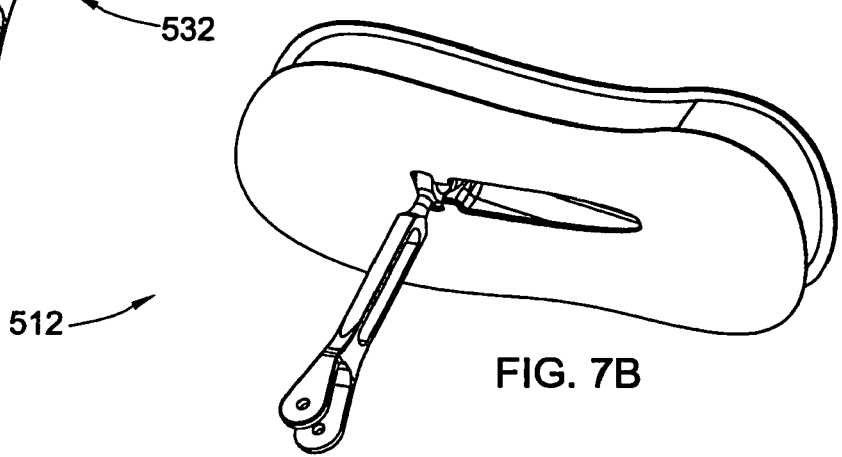
Figure 7C:
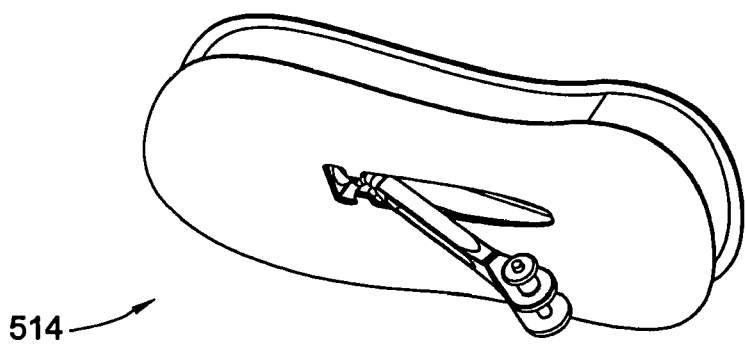

FIGS. 7A, 7B, and 7C are perspective views according to the various embodiments of the invention. FIG. 7D is a detailed view illustrating a portion of FIG. 7A. For the embodiments, an apparatus may include a socket 516 having a wide opening 550 and a narrow opening 552. A strut 532 may have a strut body 528 and a coupling element 522 at an end 530 thereof may be adapted to pass through the wide opening 550 when in a first orientation 512 (FIG. 7B), and may be adapted to be prevented from passing through the narrow opening 552 when in a second orientation 514 (FIG. 7C). The socket 516 and the coupling element 522 may be co-adapted to enable the coupling element 522 to move from the first orientation 512 to the second orientation 514 while the coupling element 522 is substantially contained within the socket, and such that the coupling element 522 may be captured within the socket in the second orientation.

Figure 8:
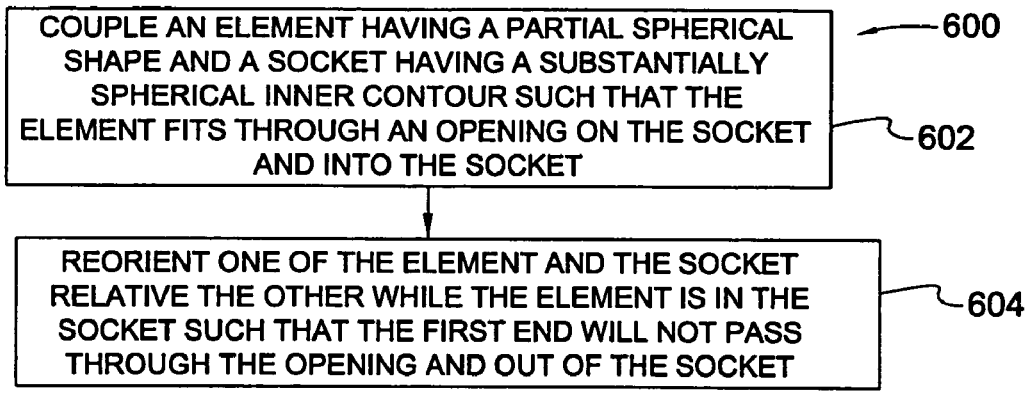
FIG. 8 is a flow diagram illustrating a method according to various embodiments in accordance with the invention.

FIG. 8 is a flow diagram illustrating a method 600 according to various embodiments in accordance with the invention. The method 600 may include:

coupling an element having a partial spherical shape and a socket having a substantially spherical inner contour such that the element fits through an opening on the socket and into the socket, 602; and reorienting one of the element and the socket relative the other while the element is in the socket such that the first end will not pass through the opening and out of the socket, 604.

One of the element and the socket may be coupled with a first end of an elongated member, and the elongated member may have a second end adapted to be coupled with a substantially fixed body.

Figure 9:
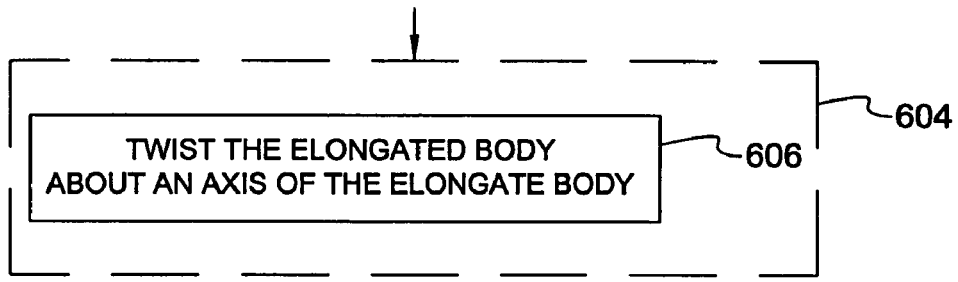
FIG. 9 is a flow diagram illustrating a method according to various embodiments in accordance with the invention.

FIG. 9 is a flow diagram illustrating a method 600 according to various embodiments in accordance with the invention. The reorienting 604 may include twisting the elongated member about an axis of the elongated member, 606.

Figure 10:
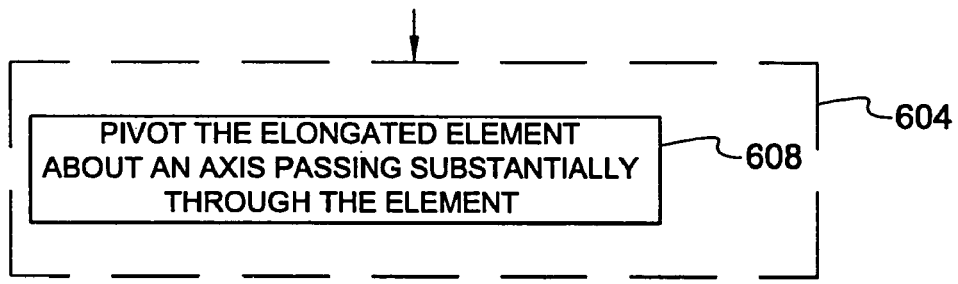
FIG. 10 is a flow diagram illustrating a method according to various embodiments in accordance with the invention.

FIG. 10 is a flow diagram illustrating a method 600 according to various embodiments in accordance with the invention. The reorienting 604 may include pivoting the elongated member about an axis passing substantially through the element, 608.

Figure 11:
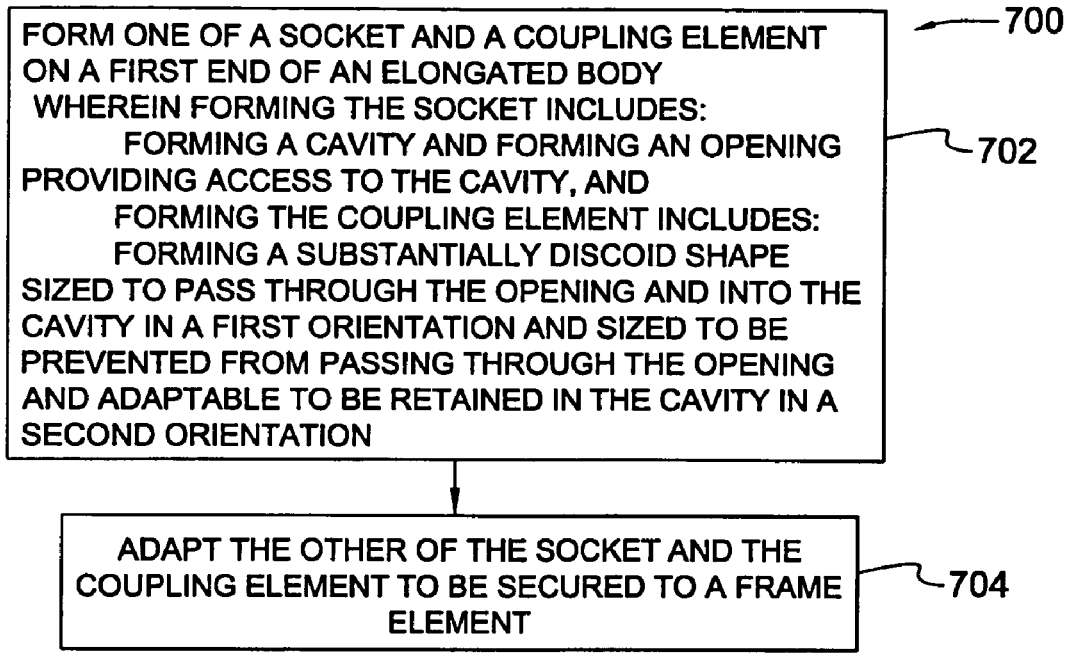
FIG. 11 is a flow diagram illustrating a method according to various embodiments in accordance with the invention.

FIG. 11 is a flow diagram illustrating a method 700 according to various embodiments in accordance with the invention. The method may include:

forming one of a socket and a coupling element on a first end of an elongated member wherein forming the socket includes forming a cavity and forming an opening providing access to the cavity, and forming the coupling element includes forming a substantially discoid shape sized to pass through the opening and into the cavity in a first orientation and sized to be prevented from passing through the opening and adaptable to be retained in the cavity in a second orientation, 702 and adapting the other of the socket and the coupling element to be secured to a frame element 704.

Figure 12:
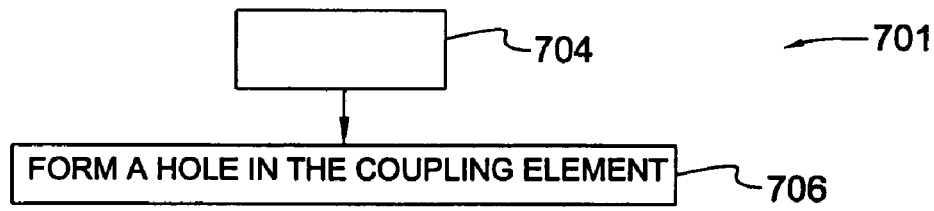
FIG. 12 is a flow diagram illustrating a method according to various embodiments in accordance with the invention.

FIG. 12 is a flow diagram illustrating a method 701 according to various embodiments in accordance with the invention. The method may include all or portions of the method 700 shown and described regarding FIG. 11 and may further comprise: forming a hole in the coupling element, 706.

Figure 13:
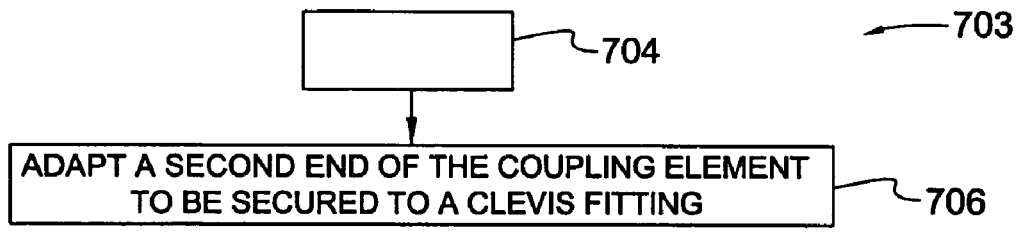
FIG. 13 is a flow diagram illustrating a method according to various embodiments in accordance with the invention.

FIG. 13 is a flow diagram illustrating a method 703 according to various embodiments in accordance with the invention. The method may include all or portions of the method 700 shown and described regarding FIG. 11 and may further comprise adapting a second end of the coupling element to be secured to a clevis fitting, 706.

In various embodiments such as the ones illustrated in FIGS. 11-13 wherein the frame element is an aircraft fuselage.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A system comprising:
    a socket mounted to a panel having inner and outer sides and having an opening including a narrow portion and a wide portion, the socket having a substantially spherical inner contour being accessible via the opening;
    a pair of members each having a discoid shape with opposing flat disc sides, one of the discoid shapes having a circumferential edge defining a partial spherical shape of a diameter substantially similar to a diameter of the spherical inner contour, the discoid shape having a cross-sectional profile such that the flat disc sides thereof are sized complementary to the opening into the socket and are adapted to pass therethrough along a direction from the outer side to the inner side of the panel when the diameter of the partial spherical shape is aligned with the wide portion and being uncoupled with the socket when the socket and the member are in a first relative orientation, the member with the partial spherical shape being further adapted to lock within the socket when the member is in the socket and is rotated into a second relative orientation with the socket, the diameter of the partial spherical shape being aligned with the narrow portion of the opening and such that the member can pivot within the socket;
    an elongated member having a first end and a second end, each of the first and second ends having one of the members rigidly mounted thereon, the member with the partial spherical shape being mounted on the first end, the member on the second end having a hole extending therethrough; and
    a body adapted to be fixed to the second end when the elongated member is rotatably locked in the second relative orientation by a pin passing from the body through the hole in the second end, the first and second ends being oriented such that at least one of the flat disc sides of the second end is aligned with the body when the elongated member is rotatably locked in the second relative orientation, the pin being removably inserted though the body and the hole in the second end to prevent rotation of the elongated member in order to rotatably lock the member with the partial spherical shape in the second relative orientation within the socket.

2. The system of claim 1 wherein the socket is coupled with a frame member.

3. The system of claim 2 wherein the frame member is an aircraft fuselage.

4. The system of claim 1 wherein the first end is oriented such that the flat disc sides thereof are aligned with the flat disc sides of the second end.

5. The system of claim 1 wherein the body is a bracket.

6. The system of claim 5 wherein the bracket is an aircraft fixture.

7. The system of claim 6 wherein the aircraft fixture is at least one of an aircraft monument and a stowage bin.

8. The system of claim 5 wherein the bracket is a clevis fitting and the flat disc sides of the second end are adapted to be aligned therewith when the elongated member is rotatably locked in the second relative orientation such that the pin passes through the through the clevis fitting and the hole in the second end.

9. The system of claim 1 wherein the discoid shape of the first end includes a hole therein to reduce weight.

10. The system of claim 1 wherein the elongated member further comprises a neck portion connecting the members on the first and second end to the elongated member, the neck portion being sized to pass through the narrow portion of the opening.

11. The system of claim 1 wherein the opening in the panel is a rectangle and wherein the wide portion defines a longitudinal axis of the rectangle and the narrow portion defines a transverse axis of the rectangle.

12. A method of connecting a body to a frame member using an elongated member having first and second ends, the body comprising a socket mounted to a panel having inner and outer sides and having an opening including a narrow portion and a wide portion, the socket having a substantially spherical inner contour being accessible via the opening, the first and second ends each having rigidly a member mounted thereon, each member having a discoid shape with opposing flat disc sides, the discoid shape of the first end having a circumferential edge defining a partial spherical shape of a diameter substantially similar to a diameter of the spherical inner contour and having a cross-sectional profile configured complementary to the opening, the member on the second end having a hole extending therethrough, the method comprising the steps of:

aligning the diameter of the first end with the wide portion of the opening such that the first end is in a first relative orientation;

passing the first end though the opening and into the socket along a direction from the outer side of the panel to the inner side thereof;

rotating the elongated member from the first relative orientation to a second relative orientation such that the diameter of the first end is coupled with the diameter of the socket, the diameter of the partial spherical shape being aligned with the narrow portion of the opening and such that the member can pivot within the socket, and such that at least one of the flat disc sides of the second end is aligned with the body; and extending a pin through the hole in the second end and through the body such that the member mounted on the first end is rotatably locked within the socket, the pin being removably inserted through the body and the hole in the second end to prevent rotation of the elongated member in order to rotatably lock the member.

13. The method of claim 12 wherein the socket is coupled with a frame member.

14. The method of claim 13 wherein the frame member is an aircraft fuselage.

15. The method of claim 12 wherein the body is a bracket.

16. The method of claim 15 wherein the bracket is an aircraft fixture.

17. The method of claim 16 wherein the aircraft fixture is at least one of an aircraft monument and a stowage bin.

18. The method of claim 16 wherein the bracket is a clevis fitting, the method further comprising the steps of:

aligning the flat disc sides of the second end with the clevis fitting;

extending a pin through the hole in the second end and through the clevis fitting such that the diameter of the first end is rotatably locked with the diameter of the socket.

* * * * *